May 29, 1962  J. E. REEVE  3,036,586
VALVES FOR PRESSURE CASKS
Filed May 5, 1960   2 Sheets-Sheet 1

Inventor
John Edwin Reeve
by Albert J. Jacobs
Attorney

May 29, 1962  J. E. REEVE  3,036,586
VALVES FOR PRESSURE CASKS
Filed May 5, 1960  2 Sheets-Sheet 2

Inventor
John Edwin Reeve
by Albert Jardes
Attorney

3,036,586
VALVES FOR PRESSURE CASKS
John Edwin Reeve, London, England, assignor to G. Hopkins & Sons Limited, London, England, a company of Great Britain and Northern Ireland
Filed May 5, 1960, Ser. No. 27,158
3 Claims. (Cl. 137—212)

This invention relates to valves and especially to valves such as are fitted to metal casks containing alcoholic liquors. It is the practice to dispense beer from metal casks so called "pressure casks" under a gas pressure and the valve through which the cask is filled is generally constructed so that beer enters through one passage and gas through another passage, the dual valve passages being arranged side by side in a single valve body secured to the cask. Difficulty arises in connection with valves of this character in obtaining the exact location of a racking nozzle, by means of which the cask is filled with the valve body, as the entry openings in the valve body i.e. for liquid and for gas are arranged side by side and axial and/or rotational adjustment both of the dual valve and the co-operating outlets from the nozzle must be effected to ensure correct alignment during filling. The object of the present invention is to obviate this disadvantage and to provide a valve capable of being accurately located with a racking nozzle irrespective of the position of the inlets of the valves relatively to the outlets from a racking nozzle.

According to the invention a valve for a closed vessel for example a metal pressure cask for holding alcoholic liquor under gas pressure and comprising independent passages for the gas and for the liquid is characterised in that said passages are arranged concentrically one within the other.

Preferably the inner passage is used for the alcoholic liquor and the outer passage for the gas.

In order that the invention may be clearly understood and readily carried into effect, reference is directed to the accompanying drawings, wherein.

Figure 1:
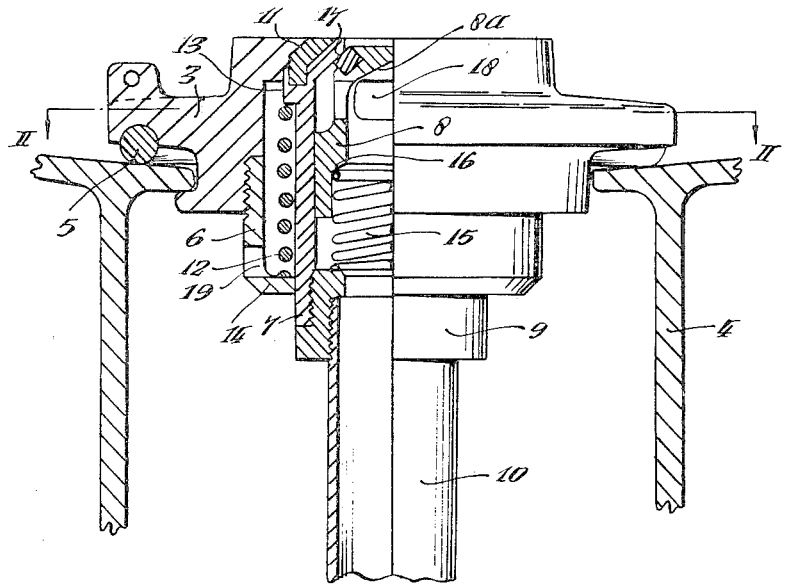
FIGURE 1 shows in sectional elevation a valve in accordance with the present invention as applied to a metal cask.
Figure 2:
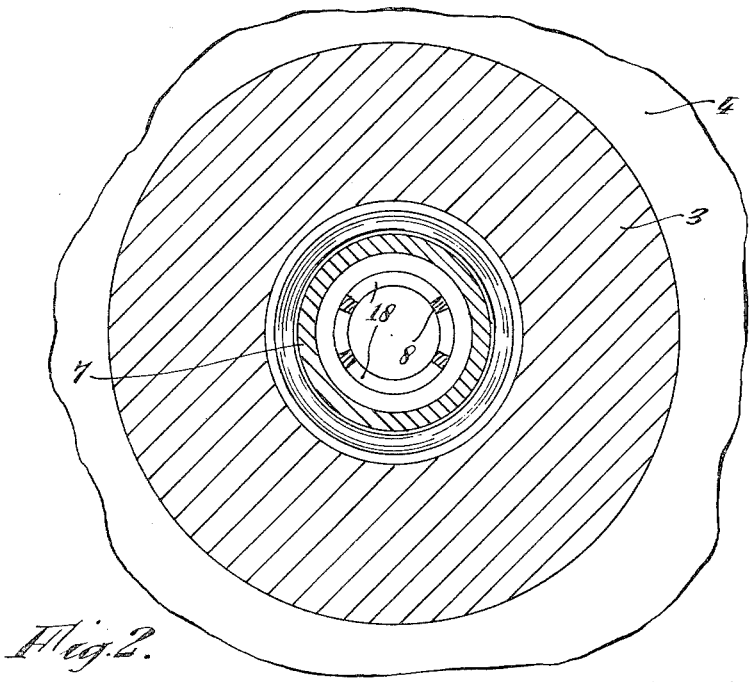
FIGURE 2 is a section on the line II—II of FIGURE 1.

Referring firstly to FIGURES 1 and 2 of the drawings which illustrate one preferred form of the invention comprising a valve body 3 attached to a cask 4 in the known manner, by means of a breech-lock for example, with the inter-position of a gasket 5. The valve body 3 has attached thereto on the underside thereof, a sleeve 6 to embrace an outer valve member 7 of cylindrical form enclosing an inner valve member 8 also of cylindrical form and provided with a closed end 8a. The outer valve member is fitted with a bush 9 at its inner end to receive a liquid entry pipe 10 which in the usual way extends to a point adjacent the bottom of the cask 4. The upper end of the outer valve member 7 has a seating 11 on the valve body and is spring loaded by means of a spring 12 disposed between a shoulder 13 on the outer valve member 7 and a flange 14 on the sleeve 6. The inner valve member is also spring loaded by means of a spring 15 which bears at one end on the bush 9 and at the other end on a shoulder 16 provided on the inner cylindrical valve member 8; the spring loading maintains the latter valve member closed on a seating 17 provided on the outer valve member 7. Ports 18 are provided in the inner valve member for the passage of the alcoholic liquor when the valve 8 is moved off its seating 17 and ports 19 are provided in the sleeve 6 to permit the passage of gas when the outer valve member 7 is moved away from its seating 11, in both cases against the action of their related springs 15 and 12 respectively.

Figure 3:
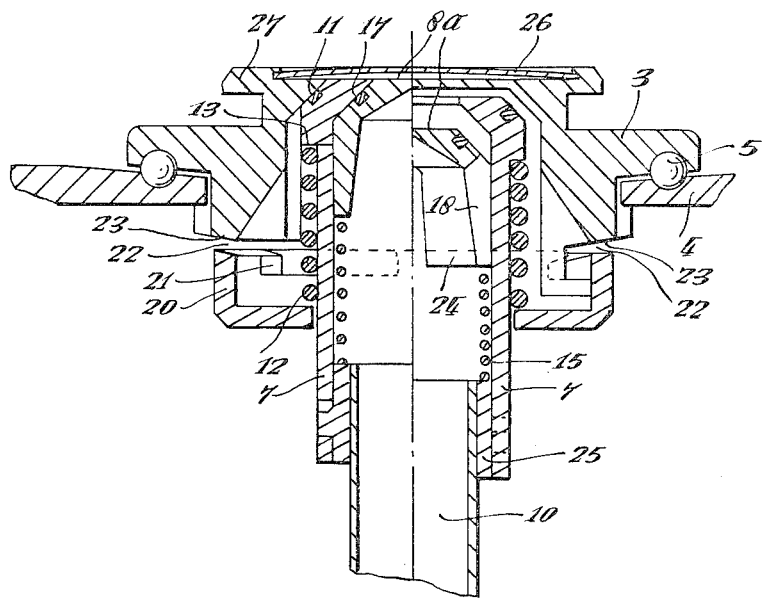
FIGURE 3 is a similar view to FIGURE 1 showing in vertical section a form of valve modified to enable cleansing fluids to be more effectively passed into a cask when desired. The same references are used for the same or equivalent parts throughout the drawings.

Referring now to FIGURE 3, the valve member therein shown is used not only for filling a cask with a carbonated liquid and the requisite pressure gas but has been so designed that it can be used for the introduction of cleansing fluid to the cask whereby due to the shape of the exit passages from the valve which provides a better distribution of the cleansing liquid over the interior walls of the cask can be obtained.

The construction of valve is substantially identical to that previously described consisting of a valve body 3 attached to a cask 4 with the interposition of a gasket 5 but in place of the sleeve 6, of the prior construction a cup shaped member 20 is attached to the valve body 3 by a bayonet joint connection 21 in such a manner that peripheral gaps 22 are left between the top edge of the cup 20 and the lower edge 23 of the valve body, the outlets from the gaps 22 being so shaped as to direct a stream of liquid issuing therethrough towards the head of the cask when the valve is used for the introduction of cleansing and rinsing liquids. With this construction the spring 12 used to maintain the outer valve member 7 on its seating 11 is disposed between the shoulder 13 as before and the base of the cup 20. The inner valve member 8 of the previous construction is replaced by a valve member 24, spring loaded as before by spring 15. The valve member 24 is a three-legged structure having a closed end 8a the gaps between the three legs forming passages 18 for the flow of gas or liquid to the cask by way of the entry pipe 10. The entry pipe 10 is provided with one component of a bayonet joint member 25, the other component of which is formed in the lower end of the outer valve member 7, the spring 15 bearing against the legs of the valve 24 and the inner end of the bayonet joint 25.

In certain cases it may be desirable to provide a sealing disc 26 for temporary closure of the valve when the cask has been filled, the valve body 3 having a projection 27 to receive the disc 26 and so formed as to facilitate entry into a racking head.

In operation a racking nozzle such for example as described in the specification of co-pending application for British Patent No. 8,266/59 is adapted to depress the closed end 8a of the inner valve member 8 and thus move the latter from its seating 17 against the spring 15 to permit liquor to flow through the valve by way of the ports 18 to the pipe 10 and the bottom of the cask, at the same time, the outer valve member 7 is moved away from its seat 11 against the loading applied by the spring 12 to open a passage for gas through the valve and ports 6. It will be appreciated that the passage thus provided will permit gas to flow in either direction to maintain equilibrium or balance between the applied gas pressure and that obtaining in the cask as the filling with liquid takes place.

The invention is subject to modification in constructional details for example the top face of the valve may include a sealing ring on the face or recessed therein or mounted at the peripheral corner. Further, the member 6 may have a skirt extending a short distance into the cask, the ports 19 with such an arrangement would be made in the base flange 14.

The invention provides a concentric arrangement of dual valve adapted to be opened simultaneously or in sequence as desired upon application of a suitable supply nozzle applied axially to the valve and accurately centered relatively to the nozzle of an automatic racking apparatus.

What I claim and desire to secure by Letters Patent is:

1. A valve for a metal pressure cask for holding alcoholic liquor under gas pressure comprising a valve body adapted to be attached to a cask by locking means, a sleeve attached to the underside of said body, an outer valve member of cylindrical tubular form embraced by said sleeve, an inner valve member of cylindrical tubular form enclosed by and slidable in said outer valve member and provided with a closed end, a single sealing means between said inner valve and said outer valve, a single sealing means between said outer valve and said valve body, independent inlet passages arranged concentrically one within the other being formed between and by said sleeve and said outer valve member and between said outer valve member and said inner valve member respectively and a liquid entry pipe secured to said outer valve member and movable upon opening said valve.

2. A valve as claimed in claim 1 wherein the upper end of the outer valve member has a seating on the valve body and is spring loaded and the inner valve member is spring loaded by a separate spring and has a seating provided on the outer valve member.

3. A valve as claimed in claim 1 wherein ports are provided in the inner valve member for the passage of the alcoholic liquor when the valve is moved off its seating and ports are provided in the sleeve to permit the passage of gas when the outer valve member is moved away from its seating, against their respective spring loading.

References Cited in the file of this patent
UNITED STATES PATENTS

| | | |
|---|---|---|
| 807,269 | Hildebrand | Dec. 12, 1905 |
| 2,638,914 | Flaith | May 19, 1953 |
| 2,961,131 | Bradbury | Nov. 22, 1960 |